US012103318B2

(12) United States Patent
Sangkaratana et al.

(10) Patent No.: US 12,103,318 B2
(45) Date of Patent: *Oct. 1, 2024

(54) THERMAL TRANSFER RIBBON ASSEMBLY COMPRISING A METAL LAYER AND A PROTECTIVE COATING LAYER

(71) Applicant: Illinois Tool Works Inc., Glenview, IL (US)

(72) Inventors: Suwit John Sangkaratana, Crown Point, IN (US); Daniel Szumski, Saint John, IN (US)

(73) Assignee: Illinois Tool Works Inc., Glenview, IL (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/682,403

(22) Filed: Feb. 28, 2022

(65) Prior Publication Data

US 2022/0176711 A1 Jun. 9, 2022

Related U.S. Application Data

(63) Continuation-in-part of application No. 16/667,190, filed on Oct. 29, 2019, now Pat. No. 11,279,144.

(Continued)

(51) Int. Cl.

*B41J 2/325* (2006.01)
*B41J 31/05* (2006.01)

(52) U.S. Cl.

CPC ............... *B41J 2/325* (2013.01); *B41J 31/05* (2013.01)

(58) Field of Classification Search

None

See application file for complete search history.

(56) References Cited

U.S. PATENT DOCUMENTS 6,306,486 B1 10/2001 Hirano et al.
7,410,551 B1 8/2008 Bethune (Continued)

FOREIGN PATENT DOCUMENTS

CN 1608217 A 4/2005
CN 1688453 A 10/2005

(Continued)

OTHER PUBLICATIONS

Extended European Search Report for corresponding EP Application No. 23158301.4 dated Apr. 7, 2023 (10 pages).

*Primary Examiner* — Justin Seo

(74) *Attorney, Agent, or Firm* — Mary D. Lawlor; The Small Patent Law Group, LLC

(57) ABSTRACT

A method for introducing a reflective, refractive, and/or diffractive variable and/or non-variable image to a substrate by use of thermal transfer printing includes simultaneously transferring a defined portion of each of a protective coating layer, an image layer, and an adhesive layer from a carrier film of a transfer ribbon to the substrate by applying heat to the transfer ribbon. The defined portions of the image layer and the protective coating layer are adhered to the substrate using the adhesive layer. Subsequent to transferring the protective coating layer, the image layer, and the adhesive layer, durability is provided to the image layer by cross-linking the protective coating layer that is over the image layer by exposing the protective coating layer to a radiation source after the defined portions of the protective coating layer, the image layer, and the adhesive layer are transferred from the carrier film.

18 Claims, 3 Drawing Sheets

Related U.S. Application Data

(60) Provisional application No. 62/753,428, filed on Oct. 31, 2018.

(56) References Cited

U.S. PATENT DOCUMENTS

| | | | |
|---|---|---|---|
| 7,544,266 | B2 | 6/2009 | Herring et al. |
| 2002/0061391 | A1 | 5/2002 | Hayashi et al. |
| 2008/0090726 | A1 | 4/2008 | Eskra et al. |
| 2008/0258457 | A1 | 10/2008 | Commander |
| 2020/0130366 | A1 | 4/2020 | Sangkaratana et al. |
| 2022/0176711 | A1 | 6/2022 | Sangkaratana et al. |

FOREIGN PATENT DOCUMENTS

| | | | |
|---|---|---|---|
| CN | 102245394 | A | 11/2011 |
| CN | 103454868 | A | 12/2013 |
| CN | 105729936 | A | 7/2016 |
| CN | 107073917 | A | 8/2017 |
| EP | 2373492 | B1 | 3/2015 |
| JP | 2002127622 | A | 8/2002 |
| JP | 2009214339 | A | 9/2009 |

THERMAL TRANSFER RIBBON ASSEMBLY COMPRISING A METAL LAYER AND A PROTECTIVE COATING LAYER

CROSS-REFERENCE TO RELATED APPLICATIONS

This application is a continuation-in-part of U.S. patent application Ser. No. 16/667,190, which was filed on Oct. 29, 2019, which claims priority to U.S. Provisional Application No. 62/753,428, which was filed Oct. 31, 2018. The entire disclosures of these applications are incorporated herein by reference.

FIELD

The present disclosure relates to thermal transfer ribbon printing of reflective, refractive, and/or diffractive images onto a substrate.

BACKGROUND

FIG. 1 illustrates a cross-sectional view of a known substrate 10 that includes a metallic image introduced thereto with a dry metallic layer. The substrate 10 includes metal layer 14 and adhesive layer 16 adhered thereto. The metal layer 14 and the adhesive layer 16 may be disposed on a surface 12 of the substrate as a portion of an image. The adhesive layer 16 adheres the metal layer 14 to the surface 12 of the substrate 10 to form each of the individual metallic printed objects on the surface 12. In alternative embodiments, the metal layer 14 may be an ink or paint that may be ink printed or ink-dropped onto the surface 12 of the substrate 10.

Handling of the identification card, however, can damage the integrity of the metal layer 14. For example, the metal layer 14 may rub off the substrate 10 when the identification card is moved into and/or out of a wallet or pocket. Therefore, after the metal layer 14 is adhered to the surface 12 of the substrate 10, a laminate film 18 is subsequently placed over the top of the metal layer 14 such that the laminate film 18 is coupled with the metal layer 14 and the surface 12 of the substrate 10. For example, the laminate film 18 may be a patch or strip of laminate material that extends over the entire surface on the card.

This laminate film 18 may interfere with other components of the identification card, such as magnetic strips, holograms, or the like, may be aesthetically unpleasing, or the like. Additionally, applying the laminate film 18 reduces the brightness, reflectiveness, or the like, of the metal layer 14. For example, the metal layer 14 may be have a mirror-like reflectiveness or may be a bright metallic finish prior to the application of the film 18. After applying the laminate film 18, the laminate film 18 reduces the brightness of the metallic finish of the metal layer 14, reduces the reflectiveness of the metal layer 14, or the like. The laminate film may also delaminate over time starting at the edge of the card.

In alternative embodiments, the metallic images may be introduced onto the substrate as a paint or ink that may be dropped or painted onto the substrate. The metallic images may be introduced onto substrates by depositing metallic ink or paint onto the surface of the substrate. However, use of ink is a messy process and additional ink may splatter onto one or more surfaces of the substrate. Additionally, the amount and size of metallic particles to create a bright, shiny metallic image is limited to the size of the dispensing nozzle. And furthermore, the dispensing nozzle may become clogged with dry ink or paint between applications.

Optionally, the metal layer 14 can be thermal transfer printed from a carrier ribbon that includes a highly cross-linked base layer. This highly crosslinked base layer can be a polymer layer that is between the supporting carrier of the ribbon and the metal layer 14. The highly crosslinked base layer can be cross-linked prior to transferring the metal layer 14 to the substrate 10 and can be transferred to the substrate 10 with the metal layer 14 to protect the metal layer 14. But, highly crosslinked base layers can be difficult to transfer from the carrier ribbon due to the crosslinking of the base layer. Therefore, the portion of the metal layer 14 and the base layer that is transferred can be less sharp or less defined than if the base layer were not crosslinked.

BRIEF DESCRIPTION

In one or more embodiments of the subject matter described herein, a method for introducing a reflective, refractive, and/or diffractive metallic variable and/or non-variable image to a substrate by use of thermal transfer printing includes simultaneously transferring a defined portion of each of a protective coating layer, a metal layer, and an adhesive layer from a carrier film of a thermal transfer ribbon to the substrate by applying heat to the thermal transfer ribbon. The method includes adhering the defined portions of the metal layer and the protective coating layer that were transferred to the substrate using the adhesive layer and, subsequent to transferring the defined portions of the protective coating layer, the metal layer, and the adhesive layer, providing durability to the defined portion of the metal layer that is transferred to the substrate by cross-linking the defined portion of the protective coating layer that is over the defined portion of the metal layer by exposing the protective coating layer to a radiation source after the defined portions of the protective coating layer, the metal layer, and the adhesive layer are transferred from the carrier film.

In one or more embodiments of the subject matter described herein, a system for introducing a reflective, refractive, and/or diffractive metallic variable and/or non-variable image to a substrate by use of thermal transfer printing includes a thermal transfer ribbon comprising a protective coating layer, a metal layer, and an adhesive layer. A defined portion of each of the proactive coating layer, the metal layer, and the adhesive layer are simultaneously transferred from a carrier film of the thermal transfer ribbon to the substrate by applying heat to the thermal transfer ribbon. The defined portions of the metal layer and the protective coating layer that were transferred are adhered to the substrate using the adhesive layer. Subsequent to transferring the defined portions of the protective coating layer, the metal layer, and the adhesive layer, the defined portion of the protective coating layer is cross-linked by exposing the protective coating layer to a radiation source after the defined portions of the protective coating layer, the metal layer, and the adhesive layer are transferred from the carrier film. Cross-linking the defined portion of the protective coating layer provides durability to the defined portion of the metal layer that is transferred to the substrate.

In one or more embodiments, a method includes simultaneously transferring a defined portion of each of a protective coating layer, a metal layer, and an adhesive layer from a carrier film of a thermal transfer ribbon to a substrate by applying heat to the thermal transfer ribbon. The method includes adhering the defined portions of the metal layer and the protective coating layer that were transferred to the substrate using the adhesive layer and, subsequent to transferring the defined portions of the protective coating layer, the metal layer, and the adhesive layer, providing durability to the defined portion of the metal layer that is transferred to the substrate by cross-linking the defined portion of the protective coating layer that is over the defined portion of the metal layer by exposing the protective coating layer to a radiation source. The defined portions of the protective coating layer, the metal layer, and the adhesive layer that are transferred include only necessary amounts of the protective coating layer and the metal layer to form one or more of a variable or non-variable image being introduced onto the substrate and no additional amount of the protective coating layer or the metal layer.

BRIEF DESCRIPTION OF THE DRAWINGS

The present inventive subject matter will be better understood from reading the following description of non-limiting embodiments, with reference to the attached drawings (which are not necessarily drawn to scale), wherein below.

DETAILED DESCRIPTION

While some examples of the use of this inventive technology are described in connection with a substrate representing a card, such as financial cards, security cards, and identification cards, this technology may be used in other printing applications. For example, one or more embodiments of the inventive subject matter described herein can be used to print variable information (e.g., the information is different for each of several individual units being printed upon) and/or invariable information (e.g., the information is the same for all individual units being printed upon) on medical containers (e.g., IV bags, medication bottles, etc.), packaging (e.g., boxes, bags, envelopes, shipping labels, etc.), clothing labels (e.g., clothing sizes, tags, etc.), household goods (e.g., labels on items such as plates, bowls, cups, etc.), electronics (e.g., logos, serial numbers, etc.), consumable products (e.g., wine or beer bottles, container labels such as cans or jars, etc.), consumer products (e.g., eye glasses, sunglasses, jewelry, etc.), point-of-purchase displays, or the like. For example, the substrate on which thermal transfer occurs can include any of a variety of surfaces, such as but not limited to security cards, identification cards, financial cards, packaging (e.g., luxury packaging, envelopes, boxes, etc.), medical devices (e.g., pill bottles, IV bags, etc.), or the like. The examples of objects on which the printing may occur that are provided herein are not all the possible objects on which the images can be printed using the inventive subject matter. Any object on which thermal transfer printing can be performed can be printed upon using the inventive subject matter described herein. The images that are printed can include one or more images such as numbers, letters, characters, logos, shapes, or the like. The images may be introduced onto the substrate as a dry layer.

Figure 2:
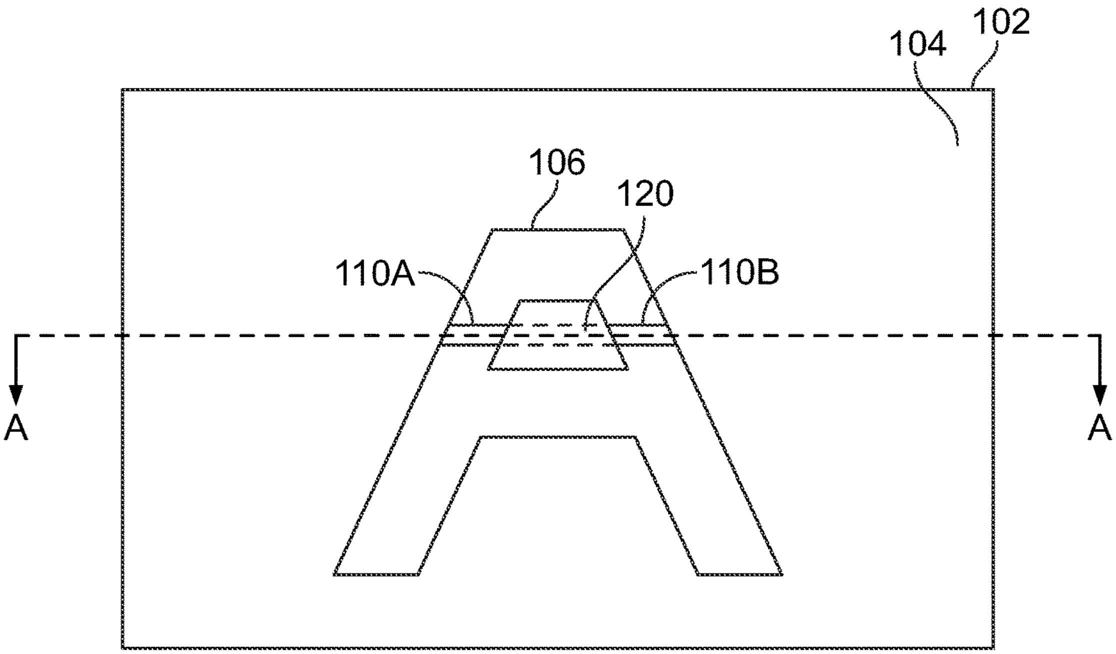
FIG. 2 illustrates a top view of a substrate in accordance with one or more embodiments of the inventive subject matter described herein.
Figure 3:
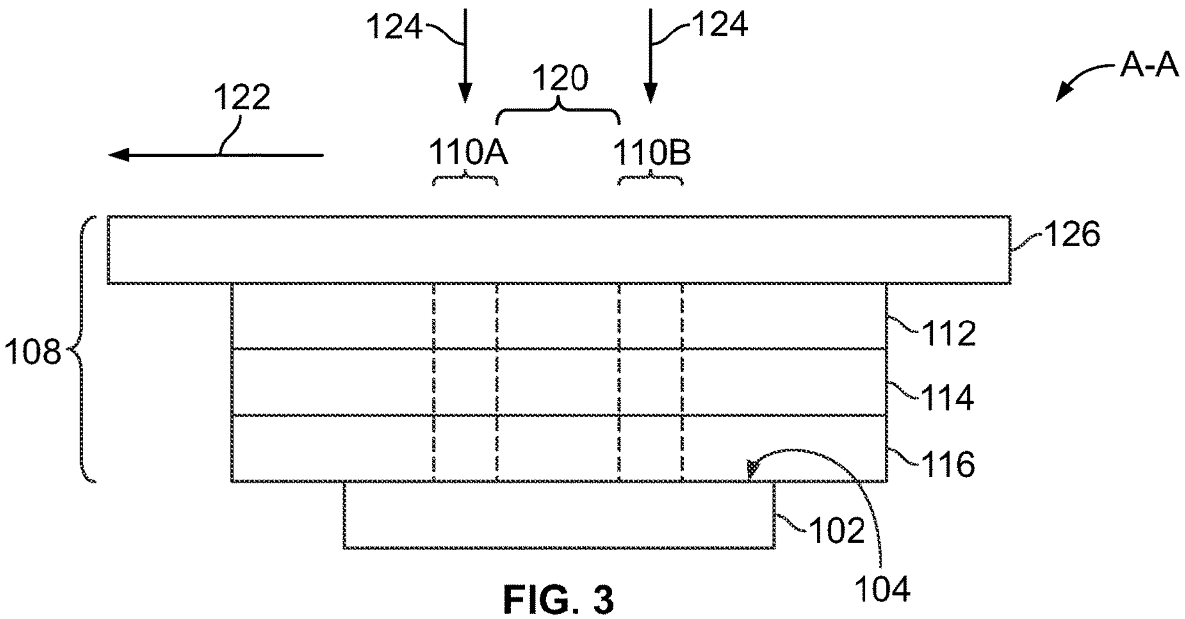
FIG. 3 illustrates a cross-sectional view of the substrate of FIG. 2.

FIG. 2 illustrates a top view of a substrate 102. FIG. 3 illustrates a side view of the substrate 102. The substrate 102 has a surface 104 onto which an image 106 is thermally printed onto from using a thermal transfer ribbon 108. The surface 104 may be a front surface or a back surface of the substrate 102, and the image 106 may be visible on the front or back surface of the substrate 102. The substrate 102 may be a planar or substantially planar card, such as an identification card, security card, or financial card. In alternative embodiments, the substrate 102 may have any alternative non-planar shape and/or size. For example, the surface 104 of the substrate 102 may be a curved or wavy surface, may be non-planar relative to the body of the substrate 102, or the like. In the illustrated embodiment, the image 106 is the letter "A". The image 106 may be a variable image (e.g., a different letter is printed onto each of several individual substrates being printed upon) or a non-variable image (e.g., the same letter "A" is printed on all individual substrates being printed upon. For example, the substrate 102 may be an identification card or a security card. The image 106 on every card may include the same logo (e.g., a non-variable image), and/or may include unique name, numbers, or the like for each owner of the card (e.g., variable image). In one or more embodiments, the image 106 may be holographic, and may be reflective, refractive, and/or diffractive holograms.

In one or more alternative embodiments, the substrate 102 may be a medication bottle, and every medication bottle may include the same prescription name (e.g., non-variable information), and/or may include unique prescription protocols for each individual user of the medication (e.g., variable information). In an alternative embodiment, the substrate 102 may be a shipping container, and every shipping container may include the same company logo (e.g., non-variable information), and/or may include unique shipping addresses for the destination of each shipping container (e.g., variable information). Alternatively, the substrate 102 may be surface of luxury packaging, such as a bag or box in which a product is stored prior to sale.

The thermal transfer ribbon 108 includes plural layers of materials that are carried on a carrier film 126 across the surface 104 of the substrate 102 in the direction 122. The thermal transfer ribbon 108 includes an adhesive layer 116, an image layer 114, and a protective coating layer 112. In one or more embodiments, the image layer may include one or more materials such as metals, mixed metal alloys, metal oxides, non-metallic materials, or the like, that may display or show an image on the surface of the substrate. The components of the protective coating layer 112 will be described in more detail below. The layers of the thermal transfer ribbon 108, along with the substrate 102 shown in FIGS. 2 and 3 are for illustrative purposes only and may not be drawn to scale. For example, each of the plural layers of the ribbon 108 may have a thickness that may be common or unique relative to the thickness of each other layer of the ribbon 108, and each layer of the ribbon 108 may have a thickness that is less than the thickness of the substrate 102.

As the thermal transfer ribbon 108 moves in the direction 122 substantially parallel to the surface 104 of the substrate 102, heat 124 is applied to the thermal transfer ribbon 108. The application of the heat 124 transfers defined portions 110A, 110B of each of the protective coating layer 112, the image layer 114, and the adhesive layer 116 from the carrier film 126 of the thermal transfer ribbon 108 to the surface 104 of the substrate 102. For example, as illustrated in FIG. 2, the defined portions 110A, 110B define areas of the image 106, and a non-defined portion 120 defines an area outside of the image 106.

Figure 1:
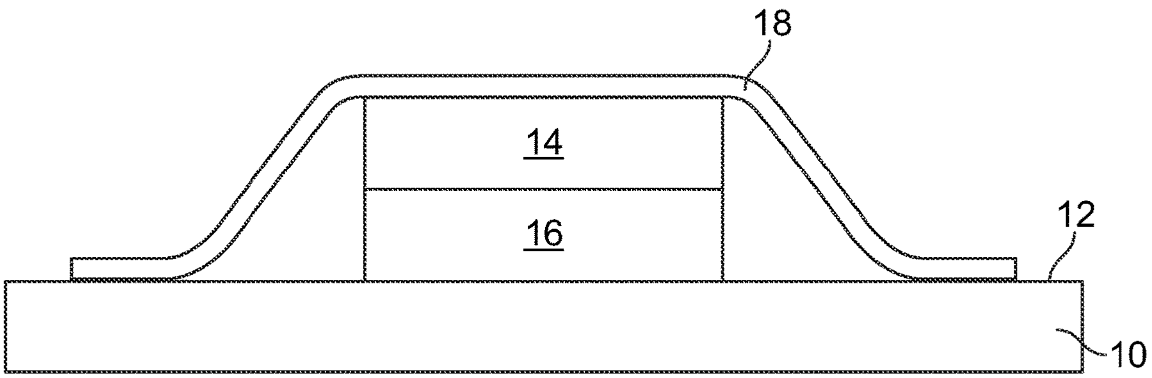
FIG. 1 (Prior Art)
FIG. 1 illustrates a known substrate.

The defined portions 110A, 110B are just that which is needed to form the image 106 on the substrate 102 and nothing more. For example, only the defined portion 110A, 110B of the protective coating layer 112 are transferred onto the substrate 102 with the defined portions of the image layer 114 and the adhesive layer 116. The protective coating layer 112 does not extend over the sides of the image layer 114 and adhesive layer 116, for example as shown in FIG. 1.

Transferring the defined portions 110A, 110B of the image layer 114 to the substrate 102 forms a continuous shape or image on the substrate 102 using the portion of the image layer 114 that is transferred. For example, the image layer may include a material (metallic material, a non-metallic material, or the like), and the material may be used to display the shape or image on the substrate. In one embodiment, the continuous shape may be a single letter, a single number, or an object of a logo that has a unitary body. In alternative embodiments, the continuous shape is may be a continuous sheet or coating over the entire substrate 102. In the illustrated embodiment of FIG. 2, the image 106 is that of the letter A, however the image may be any single or plural different letters, numbers, logos or decorative images, or the like. The transferred defined portions 110A, 110B of the image layer 114 form the shape of the image 106 on the substrate 102.

In one or more embodiments, the image may display and/or include security details. For example, the image may be an optical variable image such that viewing the image from one perspective may display one display, and viewing the image from a different perspective may display a different display or image. Optionally, the image may display and/or include letters, numbers, shapes, symbols, or the like, that may be arranged on the surface of the substrate in a predetermined arrangement. For example, the image may display personal information about an owner of the substrate, expiration information about a product associated with the substrate, directions regarding consumption and/or usage about the product associated with the substrate, logo designs (e.g., company and/or team logos, or the like), or the like.

The defined portions 110A, 110B of the image layer 114 that is transferred onto the substrate 102 is reflective, refractive, and/or diffractive. For example, in one or more embodiments, the defined portions of the material of the image layer that are transferred to the surface of the substrate may be reflective, mirror-like, or the like. For example, the material may be reflective such that light or other radiation may reflect away from the material of the image layer. The defined portions 110A, 110B of the image layer 114 that forms the image 106 may be mirror-like such that the material of the image layer 114 may provide or be capable of reflecting light or other radiation. Optionally, the topography of the material of the image layer may be changed (e.g., embossed, stamped, etched, or otherwise manipulated). Changing the topography of the material of the image layer may cause the material of the image layer to be refractive and/or diffractive. For example, light or other radiation may diffract or bend around portions of the image. For example, the defined portions of the material of the image layer 114 may diffract or bend waves (e.g., of light) around the edges of the image layer 114. As another example, waves of light or other radiation may change directions while traveling through the defined portions of the image layer.

In one or more embodiments, the image layer or metal layer may be referred to as a reflective layer, a refractive layer, and/or a diffractive layer. For example, the image layer may include one or more materials or material compositions that may reflect, refract, and/or diffract light or other radiation. The defined portions of the material or material compositions of the image layer that are transferred to the substrate may form the reflective, refractive, and/or diffractive image on the surface of the substrate. Nonlimiting examples of one or more of the materials included in the image layer may include aluminum, chromium, indium, bismuth, tin, iron, copper, zinc, niobium, zinc sulfide (ZnS), Nichrome (NiCr), stainless steel, InSn or other soldering materials, tin oxide, iron oxide, zinc oxide, idium tin oxide (ITO), or the like. Optionally, the image layer may include an alternative metal material, metal alloy, mixed metal alloy, metal oxide, or the like. Optionally, the image layer may include one or more non-metallic materials.

In one or more embodiments, the image layer may include plurals layers coupled together within the image layer. Defined portions of each of the plural layers of the image layer may generate or create the reflective, refractive, and/or diffractive image on the surface of the substrate. In one embodiment, a first layer of the image or metal layer may include a first material, and a second layer of the image or metal layer may include a different, second material. The first and second materials may reflect, refract, and/or diffract light or other sources of radiation.

The defined portions 110A, 110B of each of the adhesive layer 116, the image layer 114 and the protective coating layer 112 are simultaneously transferred onto the substrate 102 from the carrier film 126 as the thermal transfer ribbon 108 moves in the direction 122 relative to the substrate 102. For example, the defined portions 110A, 110B of the adhesive layer 116, the image layer 114, and the protective coating layer 112 are transferred all at one time and as a group onto the substrate 102. Additionally, the non-defined portion 120 is not transferred onto the substrate 102 from the carrier film 126 as the thermal transfer ribbon 108 moves in the direction 122 relative to the substrate 102. The defined portions 110A, 110B of the image layer 114 and the protective coating layer 112 are adhered to the substrate 102 using the adhesive layer 116.

The defined portions 110A, 110B that are transferred include only necessary amounts of the protective coating layer 112 and the image layer 114 to form the variable and/or non-variable image 106 being introduced onto the substrate 102 and no additional amount of the protective coating layer 112 or the image layer 114. For example, only the portions of the protective coating layer 112 that is over the portion of the image layer 114 is transferred to the substrate 102. In one embodiment, the protective coating layer 112 may be coupled with the image layer 114 such that transferring the defined portion of the image layer 114 necessarily transfers the corresponding defined portion of the protective coating layer 112.

The defined portions 110A, 110B of the protective coating layer 112, the image layer 114, and the adhesive layer 116 have sharp and non-filmy edges. For example, transferring only the defined portions 110A, 110B leaves a clear outline or clear detail of a defined edge of the image 106 relative to transferring an unnecessary amount of the protective coating layer 112 onto the substrate 102. Only the defined portions 110A, 110B of the image layer 114 that are used to form the indicia (e.g., numbers, letters, characters, decorative designs, or the like) on the substrate 102 are transferred to the substrate 102 and no more. As one example, the sharp edge may illustrate the image 106 as the number 8, but a non-sharp or filmy edge may illustrate the image as a snowman. For example, the interior holes of the number 8 may only be defined when each of the layers of the thermal transfer ribbon 108 are transferred to the substrate 102 having sharp edges (e.g., clear detail or outline of the image 106). Alternatively, the interior holes of the number 8 may not be visible if the layers of the thermal transfer ribbon 108 do not have sharp, or have less sharp edges (e.g., unclear detail or unclear outline of the image 106).

Figure 4:
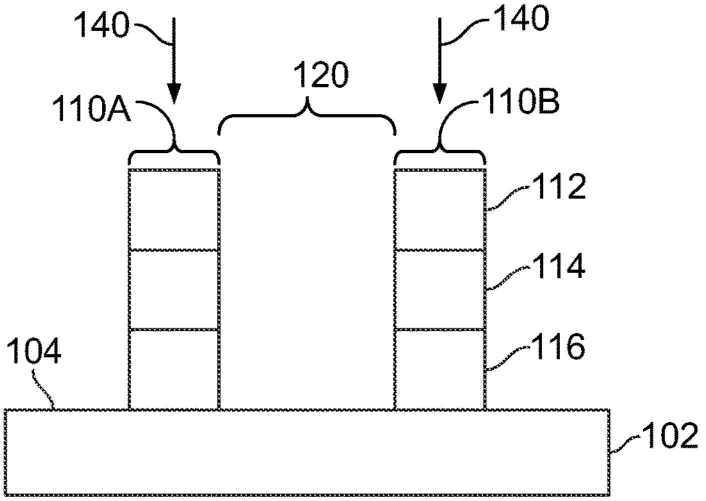
FIG. 4 illustrates a cross-sectional view of defined portions of a protective coating layer, an image layer, and an adhesive layer transferred to the substrate of FIG. 2 in accordance with one embodiment.
Figure 5:
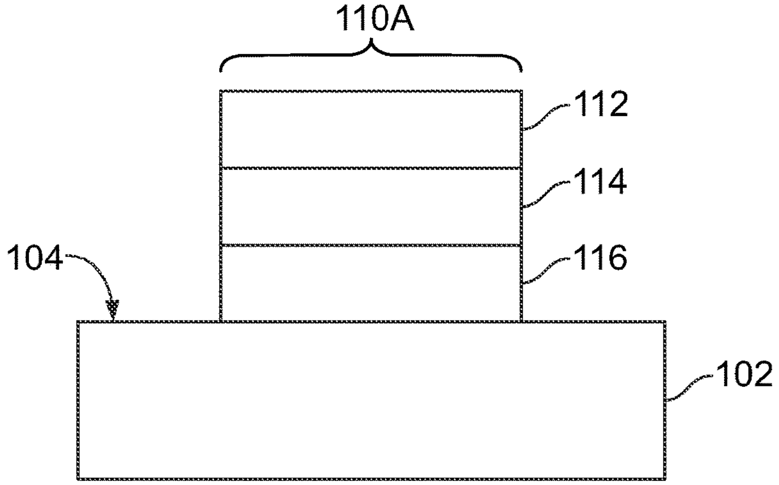
FIG. 5 illustrates a magnified cross-sectional view of the defined portions of FIG. 4.

FIG. 4 illustrates a cross-sectional view of the defined portions 110A, 110B of the protective coating layer 112, the image layer 114, and the adhesive layer 116 transferred to the substrate 102 in accordance with one embodiment. FIG. 5 illustrates a magnified cross-sectional view of the defined portions. While the defined portions 110A, 110B of each layer of the thermal transfer ribbon 108 are illustrated extending a distance away from the surface 104 of the substrate 102, FIGS. 4 and 5 are not drawn to scale and each layer of defined portions 110A, 110B extends a minimal distance away from the substrate 102. For example, the defined portions 110A, 110B may have a thickness such that the defined portions 110A, 110B may be visually substantially planar with the surface 104 of the substrate 102. For example, the thickness of the defined portions 110A, 110B on the surface 104 of the substrate 102 may not be visible unless under a magnified view.

Subsequent to transferring the defined portions 110A, 110B of each of the protective coating layer 112, the image layer 114, and the adhesive layer 116 to the substrate 102, the defined portions 110A, 110B are exposed to radiation 140 from a radiation source (not shown). The radiation source may be a lamp or alternative light source that emits ultraviolet rays, xenon, or the like. Exposing the defined portions 110A, 110B to the radiation 140 provides a durability to the defined portions 110A, 110B by cross-linking the defined portion 110A, 110B of the protective coating layer 112 that is over the defined portions 110A, 110B of the image layer 114. The protective coating layer 112 includes a polymeric transfer material and a polymeric base material that are combined as the single protective coating layer 112. In one embodiment, the polymeric transfer material may be disposed on the carrier film 126 (of FIG. 3) as the thermal transfer ribbon 108 moves across the substrate 102 and the polymeric base material may be disposed between the polymeric transfer material and the image layer 114. The protective coating layer 112 may be made of substantially even parts of the polymeric base material and the polymeric transfer material. Alternatively, the protective coating layer 112 may have a larger percentage of weight of one of the polymeric transfer or base materials than the other. In one or more embodiments, the protective coating layer 112 may include individual layers of the polymeric transfer material and the polymeric base material. For example, the protective coating layer 112 may be an assembly of two or more layers of the polymeric transfer and base material.

In one or more embodiments, cross-linking the portion of the protective coating layer 112 may cross-link the polymeric transfer material and the polymeric base material with each other in the defined portions 110A, 110B of the protective coating layer 112 that was transferred. For example, exposure of the defined portions 110A, 110B of the protective coating layer 112 to the radiation 140 chemically joins molecules of the polymeric transfer material with molecules of the polymeric base material by covalent bonds or chemical bonds. Additionally, the defined portions 110A, 110B of the protective coating layer 112 does not distort, change, melt, or the like, upon exposure of the radiation 140. For example, the radiation 140 cross-links the protective coating layer 112 without changing the integrity of the polymeric transfer material and/or the polymeric base material, thereby maintaining the integrity of the image layer 114 corresponding to the defined portions 110A, 110B of the protective coating layer 112.

Cross-linking the protective coating layer 112 forms an abrasion-resistance layer and/or a chemical-resistance layer over the defined portion 110A of the image layer 114 that was transferred. For example, the chemically joined molecules of the transfer material and the base material provide the abrasion-resistance layer over the image layer 114 to improve the durability of the image layer 114 relative to the transfer material and the base material not cross-linking or relative to the transfer material not cross-linking with itself. The abrasion-resistance layer improves the durability (e.g., wear resistance, abrasion resistance, chemical resistance, or the like) of the defined portions 110A, 110B of the image layer 114. For example, the abrasion-resistance and the chemical-resistance layer reduces the risk of the image 106 scratching or rubbing off from the substrate 102. The cross-linked protective coating layer 112 provides durability only over the defined portions 110A, 110B of the image layer 114, and not over the non-defined portion 120 (of FIGS. 2 and 3) outside of the image 106.

By cross-linking the protective coating layer 112 after the defined portions 110A, 110B of the protective coating layer 112, the image layer 114, and the adhesive layer 116 are transferred to the substrate 102, the defined portions 110A, 110B have sharper and non-filmy edges. For example, cross-linking the protective coating layer 112 increases the durability of the protective coating layer 112, thereby increasing the difficulty of cutting or transferring a clean outline or detail of the image. Transferring the defined portions 110A, 110B of the thermal transfer ribbon 108 onto the substrate 102 prior to cross-linking the protective coating layer 112 improves the sharpness, the outline or detail, or the like, of the image 106 on the substrate 102 relative to transferring the defined portions 110A, 110B after cross-linking the protective coating layer 112.

Figure 6:
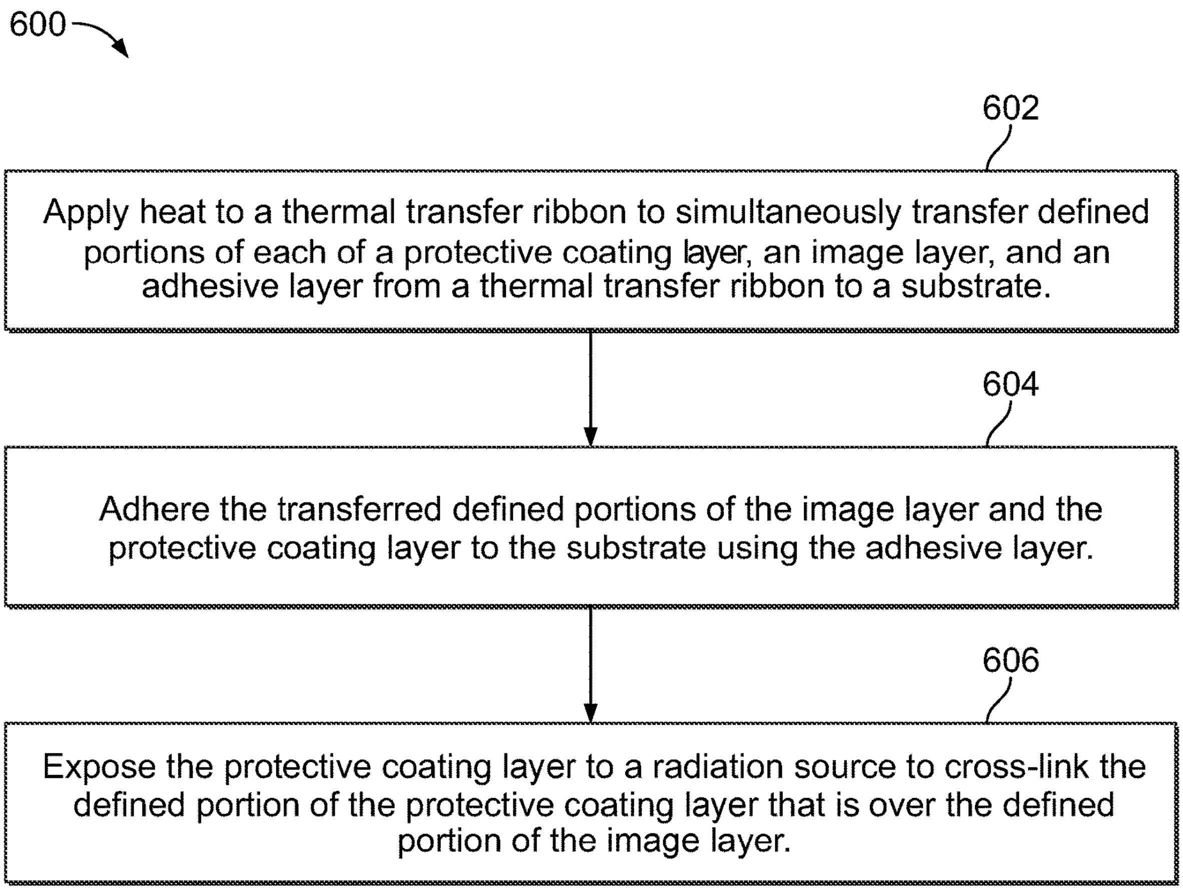
FIG. 6 illustrates a flowchart of a method of introducing an image to a substrate in accordance with one embodiment.

FIG. 6 illustrates a flowchart of one embodiment of a method 600 for introducing a reflective, refractive, and/or diffractive variable and/or non-variable image to a substrate 102 by use of thermal transfer printing. The method 600 can be used to introduce variable and/or non-variable metallic images and/or non-metallic images in connection with cards such as financial cards, security cards, and identification cards. Optionally, the method 600 may also be used to introduce variable and/or non-variable images on medical containers, packaging materials, clothing labels, household goods, electronics, or the like. The images may be metallic images, and may be shades or hues of metallic silver or gold, or optionally may include dyes or coloring such that the metallic images may be metallic shades or hues of any color of the rainbow such as, but not limited to, metallic reds, oranges, yellows, greens, blues, indigos, violets, or the like. The material used to form the images may be a reflective material, a refractive material, and/or a diffractive material. For example, the material used to form the images may create a reflective image, a refractive image, and/or a diffractive image on the surface of the substrate.

At 602, defined portions of each of a protective coating layer 112, an image layer 114, and an adhesive layer 116 are simultaneously transferred from a carrier film 126 of a thermal transfer ribbon 108 to a substrate 102 by applying heat 124 to the thermal transfer ribbon 108. For example, the defined portions of the protective coating layer 112, the image layer 114, and the adhesive layer 116 that are transferred include only necessary amounts of the protective coating layer 112 and the image layer 114 to form the variable and/or non-variable image being introduced onto the substrate 102. No additional amount of the protective coating layer 112 or the image layer 114 are transferred onto the substrate 102. For example, only the defined portion of the protective coating layer 112 that is over the portion of the image layer 114 is transferred to the substrate 102.

At 604, the transferred defined portions of the image layer 114 and the protective coating layer 112 are adhered to the surface 104 of the substrate 102 using the adhesive layer 116. The image layer may include one or more materials, such as metallic materials and/or non-metallic materials. In one or more embodiments, the one or more materials may be reflective, refractive, and/or diffractive materials such that transferring the defined portion of the material of the image layer may create or form a reflective image, a refractive image, and/or diffractive image on the surface of the substrate.

At 606, subsequent to transferring the defined portions of the protective coating layer 112, the image layer 114, and the adhesive layer 116, the defined portion of the protective coating layer 112 are exposed to radiation from a radiation source to cross-link the defined portions of the protective coating layer 112 that are over the defined portions of the image layer 114. For example, cross-linking the protective coating layer 112 provides durability to the defined portion of the image layer 114. Additionally, the protective coating layer 112 includes a polymeric transfer material and a polymeric base material disposed between the polymeric transfer material and the image layer 114. Cross-linking the protective coating layer 112 cross-links the polymeric transfer material and the polymeric base material with each other. Optionally, cross-linking the protective coating layer 112 cross-links the polymeric transfer material with itself. Additionally or alternatively, cross-linking the protective coating layer 112 forms an abrasion-resistance and/or a chemical-resistance layer on the defined portion of the transferred image layer 114

While the above description describes transferring only an amount of material of the protective coating layer, the image layer, and the adhesive layer on the substrate necessary to form letters, numbers, characters, logos, and no more, alternatively the thermal transfer ribbon 108 may apply much more of the image layer and the protective coating layer to the substrate. For example, the thermal transfer ribbon 108 may apply the image layer and the protective coating over a larger area such as, for example, an entire surface of the substrate (e.g., the entire side of a financial or identification card), a majority of the surface of the substrate, only a portion of the surface of the substrate, or the like.

In one or more embodiments of the subject matter described herein, a method for introducing a reflective and/or diffractive metallic variable and/or non-variable image to a substrate by use of thermal transfer printing includes simultaneously transferring a defined portion of each of a protective coating layer, a metal layer, and an adhesive layer from a carrier film of a thermal transfer ribbon to the substrate by applying heat to the thermal transfer ribbon. The method includes adhering the defined portions of the metal layer and the protective coating layer that were transferred to the substrate using the adhesive layer and, subsequent to transferring the defined portions of the protective coating layer, the metal layer, and the adhesive layer, providing durability to the defined portion of the metal layer that is transferred to the substrate by cross-linking the defined portion of the protective coating layer that is over the defined portion of the metal layer by exposing the protective coating layer to a radiation source after the defined portions of the protective coating layer, the metal layer, and the adhesive layer are transferred from the carrier film.

Optionally, the defined portions of the protective coating layer, the metal layer, and the adhesive layer are transferred to have sharp, defined, and non-filmy edges.

Optionally, the defined portions of the protective coating layer, the metal layer, and the adhesive layer that are transferred include only necessary amounts of the protective coating layer and the metal layer to form the variable and/or non-variable image being introduced onto the substrate and no additional amount of the protective coating layer or the metal layer.

Optionally, cross-linking the defined portion of the protective coating layer that was transferred forms one or more of an abrasion-resistant layer or a chemical-resistance layer over the defined portion of the metal layer that was transferred.

Optionally, the protective coating layer includes a polymeric transfer material on the carrier film and a polymeric base material on the polymeric transfer material and cross-linking the portion of the protective coating layer cross-links the polymeric transfer material and the polymeric base material with each other in the defined portion of the protective coating layer that was transferred.

Optionally, the protective coating layer includes a polymeric transfer coat. Cross-linking the portion of the protective coating layer cross-links the polymeric transfer material of the defined portion of the protective coating layer that was transferred.

Optionally, transferring the defined portion of the protective coating layer includes transferring only the defined portion of the protective coating layer that is over the portion of the metal layer that is transferred to the substrate.

Optionally, the protective coating layer is coupled with the metal layer such that transferring the defined portion of the metal layer necessarily transfers the corresponding defined portion of the protective coating layer.

Optionally, the defined portion of the metal layer that is transferred is reflective.

Optionally, the defined portion of the metal layer that is transferred is diffractive.

Optionally, transferring the defined portion of the metal layer to the substrate includes forming a continuous metal shape on the substrate using the defined portion of the metal layer that is transferred.

Optionally, the image that is formed on the substrate by the metal layer is a variable image.

Optionally, the image that is formed on the substrate by the metal layer is a non-variable image.

Optionally, the variable and/or non-variable image is visible on a front surface or back surface of the substrate.

Optionally, transferring the defined portions of the protective coating layer, the metal layer and the adhesive layer includes printing a number, letter, or logo on one or more of an identification card, a financial card, a security card, a medical container, a medical device, packaging materials, clothing, an electronic, a consumable product, or a consumer product.

Optionally, transferring the defined portions of the protective coating layer, the metal layer, and the adhesive layer includes transferring the metal layer and the protective coating layer to a majority of a surface of the substrate.

In one or more embodiments of the subject matter described herein, a system for introducing a reflective, refractive, and/or diffractive metallic variable and/or non-variable image to a substrate by use of thermal transfer printing includes a thermal transfer ribbon comprising a protective coating layer, a metal layer, and an adhesive layer. A defined portion of each of the proactive coating layer, the metal layer, and the adhesive layer are simultaneously transferred from a carrier film of the thermal transfer ribbon to the substrate by applying heat to the thermal transfer ribbon. The defined portions of the metal layer and the protective coating layer that were transferred are adhered to the substrate using the adhesive layer. Subsequent to transferring the defined portions of the protective coating layer, the metal layer, and the adhesive layer, the defined portion of the protective coating layer is cross-linked by exposing the protective coating layer to a radiation source after the defined portions of the protective coating layer, the metal layer, and the adhesive layer are transferred from the carrier film. Cross-linking the defined portion of the protective coating layer provides durability to the defined portion of the metal layer that is transferred to the substrate.

Optionally, the defined portions of the protective coating layer, the metal layer, and the adhesive layer are transferred to have sharp, defined, and non-filmy edges.

Optionally, the defined portions of the protective coating layer, the metal layer, and the adhesive layer that are transferred include only necessary amounts of the protective coating layer and the metal layer to form the variable and/or non-variable image being introduced onto the substrate and no additional material of the protective coating layer or the metal layer.

Optionally, cross-linking the defined portion of the protective coating layer that was transferred forms one or more of an abrasion-resistant layer or a chemical-resistant layer over the defined portion of the metal layer that was transferred.

Optionally, the protective coating layer includes a polymeric transfer material on the carrier film and a polymeric base material on the polymeric transfer material. Cross-linking the portion of the protective coating layer cross-links the polymeric transfer material and the polymeric base material with each other in the defined portion of the protective coating layer that was transferred.

Optionally, the protective coating layer includes a polymeric transfer material. Cross-linking the portion of the protective coating layer cross-links the polymeric transfer material of the defined portion of the protective coating layer that was transferred.

Optionally, only the defined portion of the protective coating layer that is over the portion of the metal layer that is transferred to the substrate is configured to be transferred.

Optionally, the protective coating layer is coupled with the metal layer such that transferring the defined portion of the metal layer necessarily transfers the corresponding defined portion of the protective coating layer.

Optionally, the defined portion of the metal layer that is transferred is reflective.

Optionally, the defined portion of the metal layer that is transferred is diffractive.

Optionally, the defined portion of the metal layer forms a continuous metal shape on the substrate using the defined portion of the metal layer that is transferred.

Optionally, the image that is formed on the substrate by the metal layer is a variable image.

Optionally, the image that is formed on the substrate by the metal layer is a non-variable image.

Optionally, the variable and/or non-variable image is visible on a front surface or a back surface of the substrate.

Optionally, transferring the defined portions of the protective coating layer, the metal layer and the adhesive layer includes printing a number, letter, or logo on one or more of an identification card, a financial card, a security card, a medical container, a medical device, packaging materials, clothing, an electronic, a consumable product, or a consumer product.

Optionally, the protective coating layer, the metal layer, and the adhesive layer are configured to be transferred to a majority of a surface of the substrate.

In one or more embodiments of the subject matter described herein, a method includes simultaneously transferring a defined portion of each of a protective coating layer, a metal layer, and an adhesive layer from a carrier film of a thermal transfer ribbon to a substrate by applying heat to the thermal transfer ribbon. The method includes adhering the defined portions of the metal layer and the protective coating layer that were transferred to the substrate using the adhesive layer and, subsequent to transferring the defined portions of the protective coating layer, the metal layer, and the adhesive layer, providing durability to the defined portion of the metal layer that is transferred to the substrate by cross-linking the defined portion of the protective coating layer that is over the defined portion of the metal layer by exposing the protective coating layer to a radiation source. The defined portions of the protective coating layer, the metal layer, and the adhesive layer that are transferred include only necessary amounts of the protective coating layer and the metal layer to form one or more of a variable or non-variable image being introduced onto the substrate and no additional amount of the protective coating layer or the metal layer.

In one or more embodiments of the subject matter described herein, a method for introducing one or more of a reflective, refractive, or diffractive image to a substrate by use of thermal transfer printing may include simultaneously transferring a defined portion of each of a protective coating layer, an image layer, and an adhesive layer from a carrier film of a thermal transfer ribbon to the substrate while the thermal transfer ribbon moves in a direction along a surface of the substrate by applying heat to the defined portions of the thermal transfer ribbon. The image layer may include a material that is one or more of a reflective material, a refractive material, or a diffractive material. The defined portions of the image layer and the protective coating layer that were transferred to the substrate may be adhered using the adhesive layer. Subsequent to transferring the defined portions of the protective coating layer, the image layer, and the adhesive layer, durability is provided to the defined portion of the image layer that is transferred to the substrate by cross-linking the defined portion of the protective coating layer that is over the defined portion of the image layer by exposing the defined portions to a radiation source after the defined portions of the protective coating layer, the image layer, and the adhesive layer are transferred from the carrier film.

Optionally, the defined portions of the protective coating layer, the image layer, and the adhesive layer are transferred to have defined edges.

Optionally, the defined portions of the protective coating layer, the image layer, and the adhesive layer that are transferred include only necessary amounts of the protective coating layer and the image layer to form one or more of a variable or non-variable image on the substrate and no additional amount of protective coating layer or the image layer.

Optionally, cross-linking the defined portion of the protective coating layer that was transferred forms an abrasion-resistant layer and/or a chemical-resistant layer over the defined portion of the image layer that was transferred.

Optionally, transferring the defined portion of the protective coating layer includes transferring only the defined portion of the protective coating layer that is over the portion of the image layer that is transferred to the substrate.

Optionally, the protective coating layer is coupled with the image layer such that transferring the defined portion of the image layer necessarily transfers the corresponding defined portion of the protective coating layer.

Optionally, transferring the defined portion of the image layer to the substrate includes forming a continuous shape on the substrate using the defined portion of the image layer that is transferred.

Optionally, non-defined portions of each of the protective coating layer, the image layer, and the adhesive layer are not transferred from the carrier film to the substrate.

Optionally, the method may include moving the thermal transfer ribbon in the direction that is parallel to the surface of the substrate to transfer the defined portion of each of the protective coating layer, the image layer, and the adhesive layer from the carrier film to the substrate.

In one or more embodiments of the subject matter described herein, a system for introducing one or more of a reflective image, a refractive image, or a diffractive image to a substrate by use of thermal transfer printing includes a thermal transfer that includes a protective coating layer, an image layer, and an adhesive layer. The image layer includes a material that is one or more of a reflective material, a refractive material, or a diffractive material. A defined portion of each of the protective coating layer, the image layer, and the adhesive layer may be simultaneously transferred from a carrier film of the thermal transfer ribbon to the substrate while the thermal transfer ribbon is moving in a direction along a surface of the substrate by applying heat to the defined portions of the thermal transfer ribbon. The defined portions of the image layer and the protective coating layer that were transferred may be adhered to the substrate using the adhesive layer. Subsequent to transferring the defined portions of the protective coating layer, the image layer, and the adhesive layer, the defined portion of the protective coating layer may be cross-linked by exposing the protective coating layer to a radiation source after the defined portions of the protective coating layer, the image layer, and the adhesive layer are transferred from the carrier film. Cross-linking the defined portion of the protective coating layer provides durability to the defined portion of the image layer that is transferred to the substrate.

Optionally, the defined portions of the protective coating layer, the image layer, and the adhesive layer may be transferred to have defined edges.

Optionally, the defined portions of the protective coating layer, the image layer, and the adhesive layer that are transferred include only necessary amounts of the protective coating layer and the image layer to form one or more of a variable or non-variable image on the substrate and no additional amount of the protective coating layer or the image layer.

Optionally, cross-linking the defined portion of the protective coating layer that was transferred forms an abrasion-resistant and/or a chemical-resistant layer over the defined portion of the image layer that was transferred.

Optionally, only the defined portion of the protective coating layer that is over the defined portion of the image layer that is transferred to the substrate may be transferred.

Optionally, the protective coating layer may be coupled with the image layer such that transferring the defined portion of the image layer necessarily transfers the corresponding defined portion of the protective coating layer.

Optionally, the material of the image layer may be the reflective material. The defined portion of the image layer may form a reflective image on the surface of the substrate.

Optionally, the material of the image layer may be a diffractive material. The defined portion of the image layer may form a diffractive image on the surface of the substrate.

Optionally, the defined portion of the image layer may form a continuous shape on the substrate using the defined portion of the image layer that is transferred.

In one or more embodiments of the subject matter described herein, a method may include simultaneously transferring a defined portion of each of a protective coating layer, an image layer, and an adhesive layer from a carrier film of a thermal transfer ribbon to a substrate while the thermal transfer ribbon is moving in a direction along a surface of the substrate by selectively applying thermal energy to the thermal transfer ribbon. The image layer may include a material that is one or more of a reflective material, a refractive material, or a diffractive material. The defined portions of the image layer and the protective coating layer that were transferred to the substrate may be adhered to the substrate using the adhesive layer. The defined portion of the image layer may form one or more of a reflective image, a refractive image, or a diffractive image. Subsequent to transferring the defined portions of the protective coating laying, the image layer, and the adhesive layer, durability may be provided to the defined portion of the image layer that is transferred to the substrate by cross-linking the defined portion of the protective coating layer that is over the defined portion of the image layer by exposing the defined portion of the protective coating layer to a radiation source. The defined portions of the protective coating layer, the image layer, and the adhesive layer that are transferred may include only necessary amounts of the protective coating layer and the image layer to form the one or more of the reflective image, the refractive image, or the diffractive image on the substrate and no additional amount of one or more of the protective coating layer or the image layer.

Optionally, the defined portions may be transferred to the substrate while the thermal transfer ribbon moves in the direction along the surface of the substrate by selectively applying thermal energy to the thermal transfer ribbon. Non-defined portions defining unnecessary amounts of the protective coating layer and the image layer may not be transferred to the substrate while the thermal transfer ribbon moves in the direction along the surface of the substrate.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. § 112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method of introducing one or more of a reflective, refractive, or diffractive image to a substrate by use of thermal transfer printing, the method comprising:

simultaneously transferring a defined portion of each of a protective coating layer, an image layer, and an adhesive layer from a carrier film of a thermal transfer ribbon to the substrate while the thermal transfer ribbon moves in a direction along a surface of the substrate by selectively applying heat to the defined portions of the thermal transfer ribbon, the image layer including a material that is one or more of a reflective material, a refractive material, or a diffractive material;

adhering the defined portions of the image layer and the protective coating layer that were transferred to the substrate using the adhesive layer; and subsequent to transferring the defined portions of the protective coating layer, the image layer, and the adhesive layer, providing durability to the defined portion of the image layer that is transferred to the substrate by cross-linking the defined portion of the protective coating layer that is over the defined portion of the image layer by exposing the defined portions to a radiation source.

2. The method of claim 1, wherein the defined portions of the protective coating layer, the image layer, and the adhesive layer that are transferred include only necessary amounts of the protective coating layer and the image layer to form one or more of a variable or non-variable image on the substrate and no additional amount of the protective coating layer or the image layer.

3. The method of claim 1, wherein cross-linking the defined portion of the protective coating layer that was transferred forms an abrasion-resistant layer and/or a chemical-resistant layer over the defined portion of the image layer that was transferred.

4. The method of claim 1, wherein transferring the defined portion of the protective coating layer includes transferring only the defined portion of the protective coating layer that is over the portion of the image layer that is transferred to the substrate.

5. The method of claim 1, wherein the protective coating layer is coupled with the image layer such that transferring the defined portion of the image layer necessarily transfers the corresponding defined portion of the protective coating layer.

6. The method of claim 1, wherein transferring the defined portion of the image layer to the substrate includes forming a continuous shape on the substrate using the defined portion of the image layer that is transferred.

7. The method of claim 1, wherein non-defined portions of each of the protective coating layer, the image layer, and the adhesive layer are not transferred from the carrier film to the substrate.

8. The method of claim 1, further comprising moving the thermal transfer ribbon in the direction that is parallel to the surface of the substrate to transfer the defined portion of each of the protective coating layer, the image layer, and the adhesive layer from the carrier film to the substrate.

9. A system for introducing one or more of a reflective image, a refractive image, or diffractive image to a substrate by use of thermal transfer printing, the system comprising:

a thermal transfer ribbon comprising a protective coating layer, an image layer, and an adhesive layer, wherein the image layer includes a material that is one or more of a reflective material, a refractive material, or a diffractive material, wherein a defined portion of each of the protective coating layer, the image layer, and the adhesive layer are configured to be simultaneously transferred from a carrier film of the thermal transfer ribbon to the substrate while the thermal transfer ribbon is moving in a direction along a surface of the substrate by selectively applying heat to the defined portions of the thermal transfer ribbon, wherein the defined portions of the image layer and the protective coating layer that were transferred are configured to be adhered to the substrate using the adhesive layer, and wherein, subsequent to transferring the defined portions of the protective coating layer, the image layer, and the adhesive layer, the defined portion of the protective coating layer is configured to be cross-linked by exposing the protective coating layer to a radiation source after the defined portions of the protective coating layer, the image layer, and the adhesive layer are transferred from the carrier film, wherein cross-linking the defined portion of the protective coating layer provides durability to the defined portion of the image layer that is transferred to the substrate.

10. The system of claim 9, wherein the defined portions of the protective coating layer, the image layer, and the adhesive layer that are transferred include only necessary amounts of the protective coating layer and the image layer to form one or more of a variable or non-variable image on the substrate and no additional amount of the protective coating layer or the image layer.

11. The system of claim 9, wherein cross-linking the defined portion of the protective coating layer that was transferred forms an abrasion-resistant layer and/or a chemical-resistant layer over the defined portion of the image layer that was transferred.

12. The system of claim 9, wherein only the defined portion of the protective coating layer that is over the defined portion of the image layer that is transferred to the substrate is configured to be transferred.

13. The system of claim 9, wherein the protective coating layer is coupled with the image layer such that transferring the defined portion of the image layer necessarily transfers the corresponding defined portion of the protective coating layer.

14. The system of claim 9, wherein the material of the image layer is the reflective material, wherein the defined portion of the image layer is configured to form a reflective image on the surface of the substrate.

15. The system of claim 9, wherein the material of the image layer is the diffractive material, wherein the defined portion of the image layer is configured to form a diffractive image on the surface of the substrate.

16. The system of claim 9, wherein the defined portion of the image layer is configured to form a continuous shape on the substrate using the defined portion of the image layer that is transferred.

17. A method comprising:

simultaneously transferring a defined portion of each of a protective coating layer, an image layer, and an adhesive layer from a carrier film of a thermal transfer ribbon to a substrate while the thermal transfer ribbon is moving in a direction along a surface of the substrate by selectively applying thermal energy to the thermal transfer ribbon, the image layer comprising a material that is one or more of a reflective material, a refractive material, or a diffractive material;

adhering the defined portions of the image layer and the protective coating layer that were transferred to the substrate using the adhesive layer, the defined portion of the image layer configured to form one or more of a reflective image, a refractive image, or a diffractive image; and subsequent to transferring the defined portions of the protective coating layer, the image layer, and the adhesive layer, providing durability to the defined portion of the image layer that is transferred to the substrate by cross-linking the defined portion of the protective coating layer that is over the defined portion of the image layer by exposing the defined portion of the protective coating layer to a radiation source, wherein the defined portions of the protective coating layer, the image layer, and the adhesive layer that are transferred include only necessary amounts of the protective coating layer and the image layer to form one or more of the reflective image, the refractive image, or the diffractive image on the substrate and no additional amount of one or more of the protective coating layer or the image layer.

18. The method of claim 17, wherein the defined portions are transferred to the substrate while the thermal transfer ribbon moves in the direction along the surface of the substrate by selectively applying the thermal energy to the thermal transfer ribbon, and wherein non-defined portions defining unnecessary amounts of the protective coating layer and the image layer are not transferred to the substrate while the thermal transfer ribbon moves in the direction along the surface of the substrate.

* * * * *